(12) United States Patent
Spruit et al.

(10) Patent No.: US 7,738,327 B2
(45) Date of Patent: Jun. 15, 2010

(54) DEVICE AND METHOD FOR SCANNING AN OPTICAL RECORDING MEDIUM AND OPTICAL RECORDING MEDIUM

(75) Inventors: Johannes Hendrikus Maria Spruit, Eindhoven (NL); Hendrikus Albertus Johanna Looijmans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 94 days.

(21) Appl. No.: 12/089,779

(22) PCT Filed: Oct. 6, 2006

(86) PCT No.: PCT/IB2006/053661

§ 371 (c)(1),
(2), (4) Date: Apr. 10, 2008

(87) PCT Pub. No.: WO2007/042978

PCT Pub. Date: Apr. 19, 2007

(65) Prior Publication Data

US 2008/0219108 A1    Sep. 11, 2008

(30) Foreign Application Priority Data

Oct. 14, 2005    (EP) ................................ 05109563

(51) Int. Cl.
*G11B 7/00*    (2006.01)
(52) U.S. Cl. .................................. 369/44.13; 369/44.32
(58) Field of Classification Search .............. 369/44.32, 369/44.37, 44.41, 44.13, 44.35, 44.12, 44.28, 369/44.23, 47.5, 53.1, 53.23
See application file for complete search history.

(56) References Cited

U.S. PATENT DOCUMENTS 5,434,835 A    7/1995    Konno et al.

(Continued)

FOREIGN PATENT DOCUMENTS

JP    2004047033 A    2/2004

(Continued)

OTHER PUBLICATIONS

International Search Report of International Application No. PCT/IB2006/053661 Contained in International Publication No. WO2007042978, Feb. 28, 2007.

(Continued)

*Primary Examiner*—Ali Neyzari

(57) ABSTRACT

The present invention relates to a device (1) for scanning an optical recording medium (3), comprising an optical unit (5) for reading data from and/or writing data to said recording medium (3) by scanning said recording medium (3) with a radiation beam (21), said radiation beam (21) being positioned on said recording medium (3) in response to a tracking error signal, a tracking means (7) for generating said tracking error signal and a position control means (11) for controlling a radial scanning position of said radiation beam (21) in respect to a track on said recording medium (3). In order to provide a device (1) which allows a reliable tracking even in cases of asymmetric tracking conditions it is proposed that said device (1) further comprises a calibration means (9) for determining a radial offset of said tracking error signal, said radial offset being obtained by tracking a first test track (45) of a test track area (23) on said recording medium (3) having asymmetric tracking conditions, wherein the position control means (11) is adapted for controlling the radial scanning position of said radiation beam (21) in respect to a track on said recording medium (3) using said tracking error signal and said radial offset, in case of asymmetric tracking conditions. The invention further relates to a corresponding method for scanning an optical recording medium (3), a corresponding optical recording medium (3) and a corresponding computer program.

19 Claims, 4 Drawing Sheets

U.S. PATENT DOCUMENTS

| | | | |
|---|---|---|---|
| 5,553,040 | A | 9/1996 | Hanano et al. |
| 5,671,199 | A | 9/1997 | Nishikawa |
| 5,790,482 | A | 8/1998 | Saga et al. |
| 5,828,634 | A | 10/1998 | Ohno et al. |
| 6,744,712 | B2 | 6/2004 | Hanks et al. |
| 7,466,636 | B2 * | 12/2008 | Buchler et al. ........... 369/44.32 |
| 2001/0024409 | A1 | 9/2001 | Bakx |
| 2002/0003755 | A1 | 1/2002 | Fujita et al. |
| 2002/0122362 | A1 | 9/2002 | Fukumoto et al. |
| 2004/0100841 | A1 | 5/2004 | Buchler et al. |

FOREIGN PATENT DOCUMENTS

| | | |
|---|---|---|
| JP | 2004273042 A | 9/2004 |
| WO | WO03107336 A1 | 12/2003 |
| WO | WO2004086398 A1 | 10/2004 |
| WO | WO2004090879 A1 | 10/2004 |

OTHER PUBLICATIONS

Written Opinion of the International Searching Authority for International Application No. PCT/IB2006/053661, Feb. 28, 2007.

* cited by examiner

DEVICE AND METHOD FOR SCANNING AN OPTICAL RECORDING MEDIUM AND OPTICAL RECORDING MEDIUM

The present invention relates to a device for scanning an optical recording medium, said device comprising an optical unit for reading data from and/or writing data to said recording medium by scanning said recording medium with a radiation beam, said radiation beam being positioned on said recording medium in response to a tracking error signal, a tracking means for generating said tracking error signal, and a position control means for controlling a radial scanning position of said radiation beam in respect to a track on said recording medium. The invention further relates to a corresponding method for scanning an optical recording medium, a corresponding optical recording medium, and a corresponding computer program.

During scanning of an optical recording medium (such as, for example, a CD, a DVD or a BluRay Disc) it has to be ensured that the optical unit for reading data from and/or for writing data to said recording medium, and more specifically the radiation beam scanning the recording medium, follows the respective track of said recording medium data is to be read from or written to. A deviation of the actual scanned position from the position to be scanned on the track is called (radial) tracking error. It is desirable to detect said tracking error and to minimize it in order to avoid errors during the recording or the reproduction of data.

WO 03/107336 A1 discloses a method and a device for scanning an optical recording medium having data storage regions arranged thereon in generally concentrically arranged tracks. Tracking in a radial sense is maintained using a radial tracking error signal generated by detecting push pull signals from three radiation spots formed on the medium, including a main spot, a forward spot, and a rear spot. The main spot is positioned on the track to be scanned, whereas the forward and the rear spot are positioned on the lands between the track to be scanned and its respective adjacent tracks.

Known radial tracking error detection methods include (cf WO 03/107336A1)

push pull radial tracking, in which a difference in signal between two pupil halves are measured on separate detectors;

central aperture radial tracking, in which the radiation beam is split into three sub-beams by a diffraction grating and the two outer (satellite) spots are set a quarter track pitch off the main spot and the difference of their signals is used to generate the tracking error signal;

three spots push pull radial tracking, in which the radiation beam is split into three sub-beams, for example by means of a diffraction grating, and a difference between the push pull signals of the main spot and the two satellite spots is used as the tracking error signal; and Differential Phase or Time Detection (DPD or DTD) radial tracking, in which the radial tracking offset is detected by monitoring the phase of the (1, 1) order beams using a square-shaped quadrant spot detector.

It is noted that the three spot push pull radial tracking system has an advantage over one spot push pull systems in that systematic errors, including symmetric errors and asymmetric errors, may be compensated for automatically.

Thus, in (re)writable optical systems (such as, for example, CD±R, DVD±RW, BD-RE, and BD-ReWritable) the radial tracking is normally performed by using a three spot push pull method. This method compensates offsets in the push pull channel due to beam landing (that is, the effect that the spot does not land at the center of the detector) by making use of two satellite spots located in both neighboring lands of the main spot. In combination with a special detector configuration an efficient way for offset cancellation is obtained. The radial error RE may be described by:

$$RE = PP_c - G \cdot (PP_a + PP_b),$$

where $PP_c$ is the push pull signal of the central spot, $G$ is the grating ratio, and $PP_a$ and $PP_b$ are the push pull signals of the satellite spots. The grating ratio $G$ is a value chosen such that the contribution to the radial error signal from the two satellite spots is of the same order of magnitude as that from the central spot.

In general, there are two ways to position the satellite spots in respect to the central spot, which are depicted in FIGS. 2 and 3 described below. In FIG. 2 the commonly preferred way for writing data, as described in WO 03/107336 A1, is illustrated. In this case a symmetric tracking condition is present as both satellite spots observe a symmetrical surrounding. One satellite spot is surrounded by written tracks on both sides, while the other satellite spot is surrounded by non-written, or empty tracks, on both sides. However, often less preferred asymmetric tracking conditions occur, as illustrated in FIG. 3. Both satellite spots observe a written track portion on one side and an unwritten track portion on the other side. This results in a deviation of the radial error signal and has adverse effects on the radial tracking.

It has to be noted that the combination of the configuration of the optical unit and the configuration of the written and unwritten tracks on the recording medium determines whether the tracking conditions are symmetric or asymmetric. For a given configuration of the optical unit or a given method for generating the tracking error signal any configuration of written and unwritten tracks or portions of tracks will result either in symmetric or in asymmetric tracking conditions. Thus, having symmetric or asymmetric tracking conditions may be regarded as a property of the particular configuration of tracks and of the particular track currently being scanned.

In the case of a dual-layer, or more generally a multi-layer, optical recording medium with an opposite track path (OTP), the preferred grating position (that is, a symmetric tracking condition) may only be obtained for one of the layers. An example of such an OTP medium is the DVD+R/RW DL medium for which only for the L0 layer the preferred orientation (a symmetric tracking condition as illustrated in FIG. 2) is obtained, while for the L1 layer only a non-optimum orientation is obtained. This may lead to radial tracking problems. Furthermore, as an additional problem, it was found that the resulting radial tracking problems may vary from drive to drive and from disc to disc.

It is therefore an aspect of the present invention to provide a device and a method for scanning an optical recording medium as set forth in the introductory portion, and an optical recording medium to be scanned, which reduce or avoid the drawbacks described above and allows a reliable tracking, even in cases of asymmetric tracking conditions. A further aspect of the present invention is to provide a corresponding computer program.

According to the present invention a device for scanning an optical recording medium is provided, said device comprising:

an optical unit for reading data from and/or writing data to said recording medium by scanning said recording medium with a radiation beam, said radiation beam being positioned on said recording medium in response to a tracking error signal, a tracking means for generating said tracking error signal, a calibration means for determining a radial offset of said tracking error signal, said radial offset being obtained by tracking a first test track of a test track area on said recording medium having asymmetric tracking conditions, and a position control means for controlling a radial scanning position of said radiation beam in respect to a track on said recording medium, said position control means adapted for controlling the radial scanning position of said radiation beam in respect to a track on said recording medium using said tracking error signal and said radial offset, in case of asymmetric tracking conditions.

Furthermore, according to the present invention a method for scanning an optical recording medium is provided, said method comprising the steps of:

determining a radial offset for a radiation beam of an optical unit for reading data from and/or writing data to said recording medium by scanning said recording medium with said radiation beam being positioned on said recording medium in response to a tracking error signal, and of tracking of said optical recording medium using said radial offset, wherein a radial scanning position of said radiation beam in respect to a track on said recording medium is controlled using said tracking error signal and said radial offset, in case of asymmetric tracking conditions, wherein said determining step including the sub-steps of:

tracking a first test track of a test track area on said recording medium having asymmetric tracking conditions, generating said tracking error signal by means of a tracking means, and obtaining said radial offset from said tracking error signal.

The present invention is based on the insight that it is possible to calibrate the radial offset for a specific disc-drive combination by having a test track area for determining a radial offset resulting from asymmetric, but known, tracking conditions. The value of the radial offset obtained for known and predetermined testing conditions may then be used for compensating for the error resulting from asymmetric tracking conditions during actual recording or reproducing.

According to an embodiment of the present invention said optical unit is adapted for generating said test track area. Having the ability for generating the test track area used for obtaining the radial offset by itself allows the device to scan any writable or re-writable optical recording medium, without a restriction to recording media having a test area thereon prior to a first scanning by said device. Furthermore, there will be no problem of downward compatibility with older versions of recording media if any changes are made to the way the radial offset if obtained.

According to another embodiment said optical unit is adapted for generating said test track area by writing a second test track adjacent to the first test track, said second test track comprising at least one written portion and at least one unwritten portion.

According to a preferred embodiment of the invention a third test track is provided adjacent to said first test track opposite to said second test track, wherein said first test track and said third test track are, preferably, at least partially empty tracks. By examining the asymmetric tracking conditions of a test track area having said second track comprising alternating written and unwritten parts adjacent to said two empty tracks (first and third track) one avoids additional influences of written parts of said first and third track.

In a further preferred embodiment said second test track is surrounded by two at least partially empty tracks. Upon generation of said second test track having written and unwritten parts there will be no offset effects to the tracking signal used during writing if the track radially outwards and the track radially inwards from said second track are empty.

According to the present invention is it further preferred that at least one of said written and/or said unwritten portions spans an angular range being smaller than a threshold time for reaction of said position control means times the angular velocity of the recording medium during operation. In other words, it is preferred that at least one of said written and/or unwritten portions has a length being smaller than a linear scanning velocity of said recording medium during operation divided by the bandwidth of the position control means. If the time for scanning said at least one written or unwritten portion is shorter than the time in which said position control means reacts to a change in the tracking error signal, there is no adjustment of the radial scanning position of the optical unit. Thus, there is an easily measurable difference between the value of the tracking error signals for said at least one portion compared to the values of the adjacent portions.

It is further preferred that at least one written portion includes a high frequency data pattern. By providing a high frequency data pattern undesired effects of the pattern of the data itself to the tracking error signal used for obtaining said radial offset are reduced or even avoided.

In an advantageous embodiment of the present invention the optical unit is adapted for generating the test track area in a power calibration area on the recording medium. A power calibration area is conventionally used for determining an optimum power of the radiation beam (such as a laser beam) for the respective recording medium. Such an area is normally not used for recording data, and therefore there will be no interference between user data and the test track area. Furthermore, there is no danger of accidentally overwriting user data upon generation of said test track area.

In another embodiment of the present invention said tracking means is adapted to generate a push pull tracking error signal. The present invention can in particular be utilized with great benefit when using a push pull tracking. It is particularly preferred that said tracking means is adapted to generate a three spot push pull tracking error signal.

In an advantageous embodiment of the present invention the calibration means is adapted for determining a satellite radial offset for a satellite spot and a main radial offset for a main spot individually, and for determining said radial offset from said satellite radial offset and said main radial offset. Separate measurements of the radial offsets for a satellite spot and for a main spot yield an increased accuracy of the determination of the radial offset.

It is preferred that the calibration means is adapted for determining the radial offset as the mean value of said satellite radial offset and said main radial offset. It has been found that this way for calculating said radial offset gives very accurate results.

According to yet another embodiment of the present invention the position control means is adapted for using the radial offset only in case of data being written to said recording medium. Most of the reading of data from the recording medium occurs where the tracking conditions are symmetric. So the additional control effort for managing the radial offset can be omitted during reading of data from said recording medium.

According to another advantageous embodiment of the present invention the position control means is adapted for using the radial offset multiplied by a predetermined correction factor, said correction factor being in particular in the range of 1.0 to 1.7, preferably in the range of 1.0 to 1.5. It has been found that an accordingly increased value derived from said radial offset gives even better results for compensating the undesired effects of asymmetric tracking conditions.

A further embodiment of a device according to the present invention comprises a storing means for storing the radial offset, and a retrieving means for checking whether or not said radial offset is stored for a recording medium and for retrieving said radial offset. It was found that the effects of asymmetric tracking conditions change from device to device and from recording medium to recording medium. Nevertheless, for a given combination of device, for example a DVD-recorder, and recording medium, for example a DVD+R DL, there is no need for a repeated determination of the radial offset once said offset is determined and stored.

In a preferred embodiment said device further comprises identifying means for generating a medium identifier identifying the recording medium, wherein the storing means is adapted for storing said medium identifier together with the radial offset and the retrieving means is adapted for checking using said medium identifier generated by the identifying means. One way to store the radial offset after determination is to store the radial offset within the device together with a medium identifier. This allows the device to have the radial offset already present a next time the respective recording medium is presented to the device, without a need for an additional measurement of the radial offset.

An alternative way of storing the radial offset is to write it to the recording medium together with an identifier for the device for which said radial offset was obtained. According to this embodiment the storing means in a device according to the invention is adapted for storing the radial offset together with a device identifier identifying the device on said recording medium and the retrieving means is adapted for checking for the presence of an device identifier corresponding to said device on the recording medium. Upon reading of the recording medium the device is able to obtain the radial offset, again without a need for an additional measurement.

According to yet another embodiment of the present invention the calibration means is adapted for determining a plurality of radial offsets for a plurality of layers of the recording medium. In case of recording media having multiple layers it may be necessary to obtain multiple radial offset since these radial offsets may differ from layer to layer.

According to another advantageous embodiment the calibration means is adapted for determining the sign of the radial offset from a test tracking error signal generated upon scanning the first test track. By using the test tracking error signal which is obtained during the scanning of said first test track for deciding on the sign of said radial offset (that is, deciding whether the offset is directed radially inwards or outwards) it is not necessary to actually write a track using the radial offset with one sign and to test whether or not the sign was correct.

In a preferred embodiment the calibration means is adapted for determining the sign of the radial offset from a duty cycle of the test tracking error signal. Said duty cycle of the test tracking error signal (that is, the ratio of duration of a pulse or a number of pulses, such as for example the time for which said test tracking error signal is increased, to the pulse period or to the operation time) may be used for determining the sign of the radial offset based on the test track area itself, for example, the duty cycle of a pattern of written and unwritten portions.

According to a further embodiment the calibration means is adapted for determining the sign of the radial offset by comparing the test tracking error signal to a pattern of written and unwritten portions of the test track area. The sequence of written and unwritten portions may also by used for determining the sign of the radial offset, for example the influence of a written portion to the tracking error signal may easily be measured if the position (in time or on the recording medium) of said written portion is known. One way of distinguishing a written portion from an unwritten portion is, for example, to provide different lengths for these portions resulting in a specific duty cycle. Another way is the use of an asymmetric pattern, for example a long written portion followed by a short unwritten portion or a short written portion and a long unwritten portion, even if the duty cycle of the pattern would be 50%. Even an irregular pattern may alternatively be used if said pattern as such, or a part of such a pattern, is known to the device.

Thus, according to the above, it is preferred to provide pattern storage means for storing a pattern of written and unwritten portions of the test track area and/or angular positions of written and/or unwritten portions of the test track area.

It is a further aspect of the present invention to provide an optical recording medium adapted for being scanned by a device according to the present invention, said optical recording medium comprising:

in a predetermined test area a first test track for obtaining said radial offset by tracking said test track, said first test track being adjacent to a second test track, said second test track comprising at least one written portion and at least one unwritten portion.

It is advantages that if the recording medium itself is provided with a test track area for determining the radial offset, it is not necessary for the device for scanning to be provided with means for generating said test track area.

It is particularly advantageous to provide a recording medium having at least two recording layers with tracks having opposite track paths (OTP), wherein at least one of said layers is provided with the test area. With a fixed orientation of the optical unit and at least two opposite track paths, for at least one of these track path the orientation of the optical unit (that is, the positioning of the satellite spots in three spot push pull tracking) will be non-optimum. Rather than changing the orientation, for example by actually changing the configuration of the optical unit, the radial offset resulting from such asymmetric tracking conditions may be compensated.

It is a further aspect of the present invention to provide an optical recording medium adapted for being scanned by a device according to the present invention, said optical recording medium comprising a pattern thereon representing a device identifier identifying a device for scanning and representing the radial offset. The radial offset once determined for a particular combination of device and medium may be used again in later sessions, even when the radial offset differs for different combinations of recording media and devices. When the radial offset for a given combination is stored on the recording medium, an additional determination may be omitted if the recording medium latter is used again within the same device. Especially in cases where the recording medium is frequently replaced by other media, the storing of the radial offset on the recording medium itself will avoid unnecessary consumption of tracks that would otherwise be used for determining the radial offset again. Furthermore, such a recording medium including a device identifier and a corresponding radial offset may be used with devices for scanning which are not provided with means for measuring a radial offset by themselves, since the radial offset may be read from the recording medium itself.

In the following the present invention will be further described in detail with reference to the accompanying figures, in which.

Figure 1:
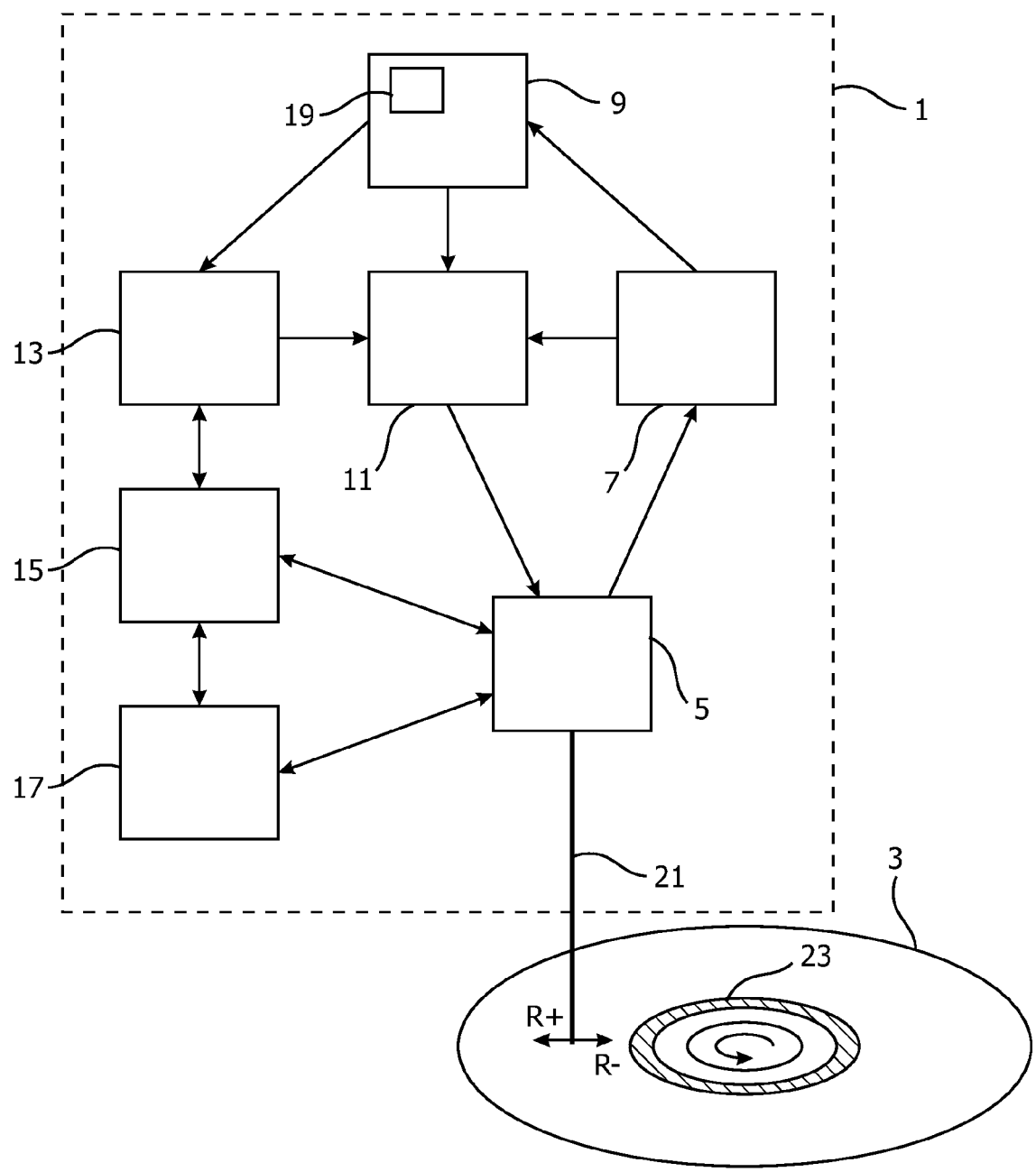
FIG. 1 shows an embodiment of a device for scanning an optical recording medium according to the invention and an optical recording medium.

FIG. 1 shows an embodiment of a device 1 for scanning an optical recording medium 3 according to the invention, and an optical recording medium 3. The device 1 for scanning comprises an optical unit 5, a tracking means 7, a calibration means 9, a position control means 11, a storing means 13, a retrieving means 15 and identifying means 17. The calibration means 9 further comprises pattern-storing means 19.

The optical unit 5 is designed for reading data from and/or writing data to the optical recording medium by means of a laser beam 21 generated by the optical unit 5, wherein said laser beam 21 is directed to a scanning position of said laser beam 21 on the recording medium 3. The scanning position of the laser beam 21 on the recording medium can be adjusted radially by adjusting the position of the optical unit 5. An alternative way to adjust the scanning position is to change the direction or path of the laser beam 21. The general operation of said device 1 for reading and/or writing corresponds to commonly known operations of devices for scanning an optical recording medium including the generation of tracking error signals and the operation of a tracking control and is therefore not described in further detail here. A more detailed explanation of the operation of a device for scanning can, for example, be found in WO 03/107336 A1.

The optical unit 5 is coupled to the tracking means 7 and an output of the optical unit 5 is used by the tracking means 7 for generating a tracking error signal. Said tracking means 7 is coupled to the calibration means 9 and to the position control means 11, and outputs said tracking error signal to the calibration means 9 and the position control means 11. Said position control means 11 is designed for controlling a radial scanning position of the optical unit 5, and thereby controlling the scanning position of the laser beam 21, in order to ensure optimum reading and/or writing conditions in the relation of said scanning position to a track of the recording medium 3. The tracking error signal generated by the tracking means is indicative for a deviation of the actual scanning position from a desired scanning position. The position control means 11 controls the scanning position of the optical unit 5 in order to minimize the tracking error signal, thereby making the scanning position follow a desired path (corresponding to a track) on the recording medium 3.

The position control means 11 may have a threshold time, for example of about 0.2 ms. This means that a tracking error signal indicating a deviation of the scanning position of the laser beam 21 from the ideal or desired position on the track to be scanned has to last at least the threshold time (in this example 0.2 ms) before the position control means will react. This ensures that sudden and short-lasting changes of the tracking error signal, which may result from measurement errors of the tracking means or from scratches or dust on the recording medium 3, will not force the position control means 11 to change the radial position of the laser beam 21 without any valid reason. Only if the changed tracking error signal lasts long enough, the position control means 11 will react. It has to be noted that alternative values for the threshold time are possible, since the optimum threshold time for the position control means 11 may be set by one skilled in the art depending on circumstances and specifications.

The recording medium 3 is provided with a test track area 23 with asymmetric tracking conditions (cf. FIG. 4 described below) arranged in a power calibration area of said recording medium. It has to be noted that the test track area may be provided in any accessible part of the recording medium and that the test track area may be generated by a device according to the invention upon a first encounter or, alternatively, by the manufacturer upon the production of the recording medium.

The calibration means 9 receives a tracking error signal generated by the tracking means 7. From the tracking error signal generated during scanning of the test track area 23 the calibrations mean 9 determines a radial offset of the tracking error signal for asymmetric tracking conditions. This radial offset is provided to the position control means 11. This position control means 11 controls the radial scanning position of the optical unit 5 to ensure that the scanning position follows the track to be scanned, wherein the radial offset is used together with the tracking error signal in case of asymmetric tracking conditions.

The radial offset is further provided to the storing means 13 coupled to the calibration means 9 in order to store said radial offset. The storing means is adapted for storing said radial offset together with a medium identifier of the recording medium for which said radial offset is obtained. Upon request of the retrieving means 15 the storing means 13 provides the position control means 11 with a radial offset previously obtained for the recording medium 3. Said storing means 13 is alternatively adapted for storing a device identifier identifying said device 1 and said radial offset on the recording medium 3 itself, wherein the optical unit 5 is used for writing a pattern representing the device identifier and the corresponding radial offset to the recording medium 3. It has to be noted that the provision of storing said radial offset is merely an option and not essential to the present invention.

The retrieving means 15 is adapted for checking for a presence of a previously determined radial offset for a recording medium 3 identified by said identifying means 17 stored within said storing means 13 and/or for checking for a presence of a previously determined radial offset stored together with a device identifier identifying said device 1 on said recording medium 3.

The medium identifier may be generated by the identifying means 17. It has to be noted that this generation may be based on predetermined characteristics of said recording medium 3 or is, alternatively, simply the reproduction of a medium identifier, like for example a serial number, provided on the recording medium 3 itself.

The calibration means 9 further comprises pattern storage means 19. Said pattern storage means 19 is provided for storing a pattern, sequence and/or angular positions of written and/or unwritten portions of the test track area 23. This information is used during the determination of the radial offset in order to determine the sign of said radial offset, that is to decide whether the asymmetric tracking conditions result in a contribution to the tracking error signal indicating a change in the scanning position which is directed radially inwards (that is, towards the center of the recording medium 3) or radially outwards (that is, away from the center of the recording medium 3).

Figure 2:
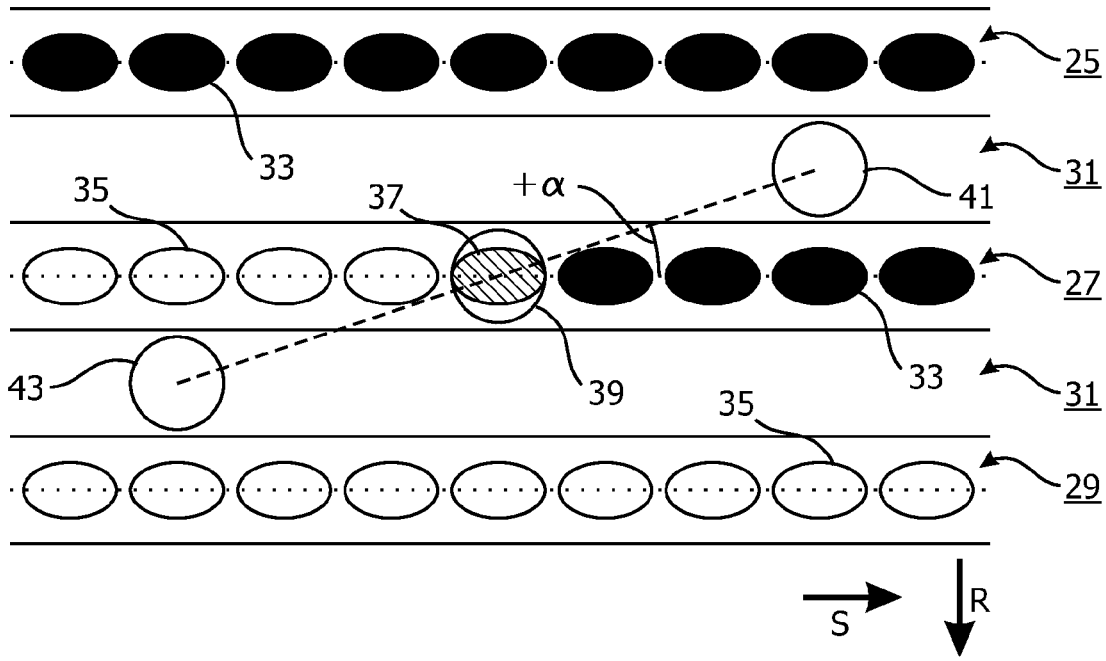
FIG. 2 illustrates a three spot push pull tracking with symmetric tracking conditions.
Figure 3:
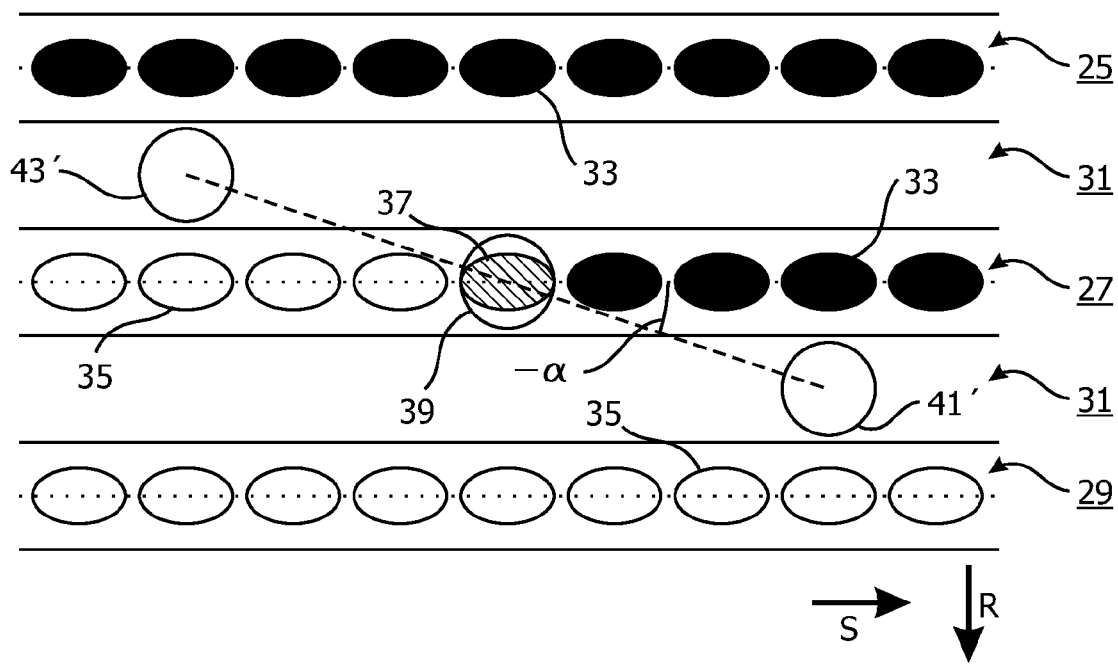
FIG. 3 illustrates a three spot push pull tracking with asymmetric tracking conditions.

FIG. 2 illustrates a three spot push pull tracking with symmetric tracking conditions. A written track 25 and an unwritten track 29 are present with a write track 27 in between. The tracks 25, 27, 29 are separated by lands 31 arranged between them. The written track 25 and the write track 27 comprise written sections 33. The unwritten track 29 and the write track 27 comprise unwritten sections 35 (it is to be noted that the unwritten sections 35 are shown in the figures for reference purposes only; on a recording medium these unwritten sections are blank and therefore not distinguishable). One section 37 of said write track 27 is currently being written to. For the purpose of tracking three laser spots are provided, a main spot 39 and a first and a second satellite spot 41, 43. The main spot 39 is positioned on the section of the write track 27 currently being written to. The satellite spots 41, 43 are positioned on the lands 31 between the write spot and the written track 25 and the unwritten track 29, respectively. The first satellite spot 41 is positioned radially inwards in the spinning direction of the illustrated part of a recording medium and the second satellite spot 43 is positioned radially outwards opposite to the spinning direction. The spinning direction is indicated by arrow S and the radial direction is indicated by arrow R. The three spots 39, 41, 43 are aligned along a line having an angle +α with a center line of the write track 27. It has to be noted that the spot alignment may be different since it is not necessary that all three spots are aligned exactly on a straight line. This applies also for the illustrations of FIGS. 3 and 4. The tracking conditions illustrated in FIG. 3 are symmetric, that is, the track sections on both sides of the satellite spots 41, 43 are identical for each of said spots 41, 43, that is either written sections 33 on both sides or unwritten sections 35 on both sides. Under such symmetric conditions the surrounding tracks cancel out the influences of each other on the signal of the satellite spot. A more detailed discussion may be found, for example, in WO 03/107336 A1.

FIG. 3 illustrates a three spot push pull tracking with asymmetric tracking conditions. The arrangement of written 33 and unwritten sections 35 of the tracks corresponds to that illustrated in FIG. 2. Again, the three laser spots are present, however now with an alignment different from that of FIG. 2. The line of said three spots includes an angle of −α with a center line of the write track 27. As a result, the tracking condition for the satellite spots is asymmetric. Both satellite spots, the first satellite spot 41' and the second satellite spot 43', have written sections 33 of tracks on one side and unwritten sections 35 on the other side. This results in an offset in the tracking error signal. This offset leads to a non-optimum tracking, that is, to a undesirable deviation from the desired path of the scanning position of the optical unit, which needs to be compensated for.

Figure 4:
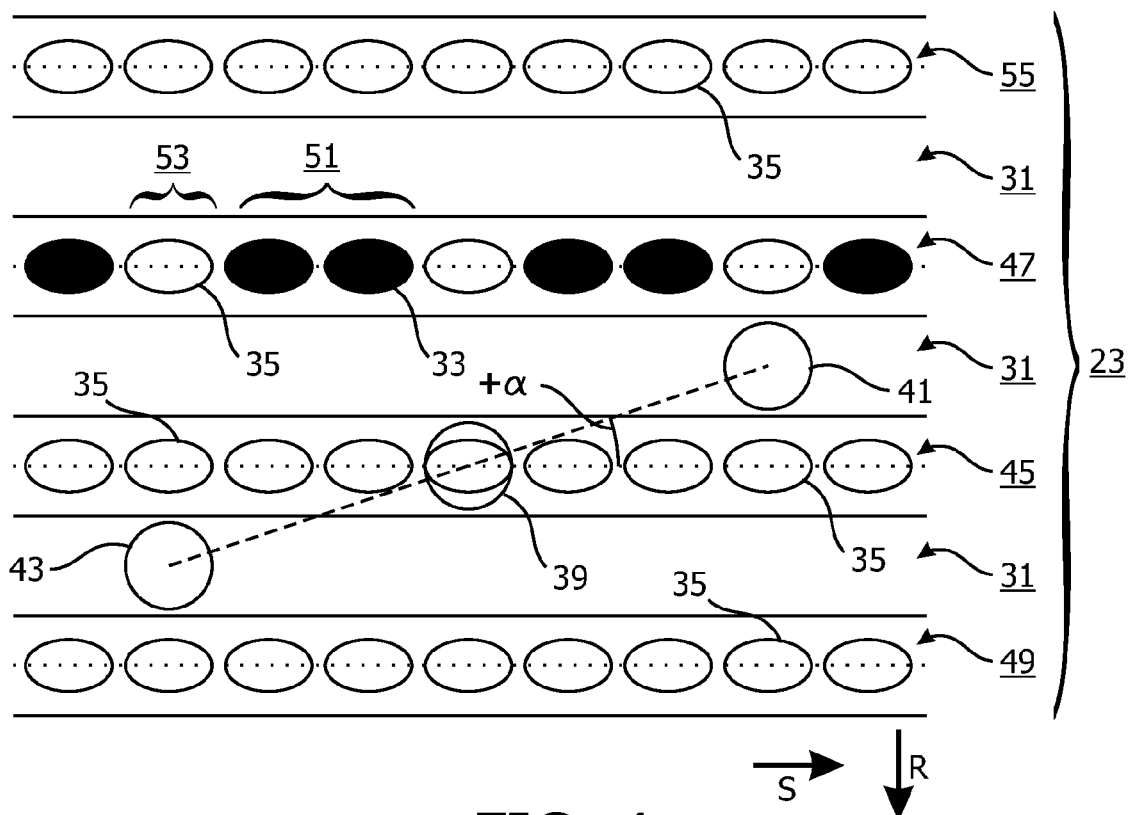
FIG. 4 illustrates a tracking of a test track area according to the present invention.

FIG. 4 illustrates a tracking of a test track area 23 according to the present invention. The test track area comprises four tracks. A first test track 45 is to be scanned during a determination of the radial offset. Said first test track is empty, that is, it comprises only unwritten sections 35, and it is surrounded by a second test track 47 radially outward and a third test track 49 radially inward. Said second test track 47 comprises written sections 33 and unwritten sections 35 forming a sequence of written portions 51 and unwritten portions 53. Said third test track 49 is completely empty. Adjacent to the second test track 47 a fourth test track 55 is arranged which is also empty. Between said test tracks 45, 47, 49, 55 lands 31 are arranged in between the tracks. In this example a device according to the invention generates the test track area 23 shown in FIG. 4 by recording the second test track 47 by itself. In this case the fourth test track 55 is provided for ensuring that there are no influences of neighboring written tracks on the generation of the second test track 47. In the alternative case of a prerecorded test track area 23, said fourth empty track 55 may be omitted, that is, there may be data written to this track. It has to be noted that the test track area 23 may be located at any position on the recording medium 3. Furthermore, the order of the tracks may be reversed, that is, the measurement can be performed at the inner side and/or at the outer side of the test track area 23. Preferably, for an dual layer OTP type recording medium, the detection is done at the inner side on the L1 layer.

The scanning arrangement corresponds to that illustrated in FIG. 2. The main spot 39 is positioned on the first test track and the satellite spots 41 and 43 are positioned on the lands 31 adjacent to said first test track. During scanning of said first test track 45 the second satellite spot 43 will have symmetric tracking conditions since both tracks surrounding it (first test track 45 and third test track 49) are empty tracks. The first satellite spot 41 will undergo a sequence of symmetric and asymmetric tracking conditions during the passing of the written portions 51 and unwritten portions 53 of the second track 47. Being surrounded by two empty sections 35, as illustrated in FIG. 4, the tracking condition for said first satellite spot 41 is also symmetric. The tracking condition after a rotation of the recording medium 3 corresponding to the length of one section will be an asymmetric condition: on one side of the first satellite spot 41 there is a written section 33 and on the other side there is an unwritten section 35. To a somewhat smaller extent the same applies to the main spot 39, wherein the distance to the respective written and unwritten neighboring sections is larger. Thus, the influence on the main spot's contribution to the tracking error signal will be smaller, that is, the radial offset due to asymmetric tracking conditions will be smaller for the main spot 39 compared to the first satellite spot 41. There is virtually no influence on the second satellite spot 43.

By measuring the signals of the three spots 39, 41, 43 used in the generation of the tracking error signal, a change in said tracking error signal, and in said individual signals, will become apparent for a transition from symmetric to asymmetric tracking conditions and visa versa. When this change in the signals is fast enough so that it will not trigger a reaction of the position control means 11, it is easy to determine the radial offset from said change as described in more detail below with reference to FIG. 5. Even if said change is not fast enough, it is possible to determine the radial offset from the reaction of the signal to the change. However, this determination might be more difficult and possibly less accurate. It has to be noted that the signals of the main spot 39 and the first satellite spot may be evaluated separately. Furthermore, it has to be noted that there may be symmetric tracking conditions for the first satellite spot 41 while the tracking conditions for the main spot 39 are asymmetric and vice versa. This is due to the lateral offset between the main spot 39 and the first satellite spot 41.

Figure 5:
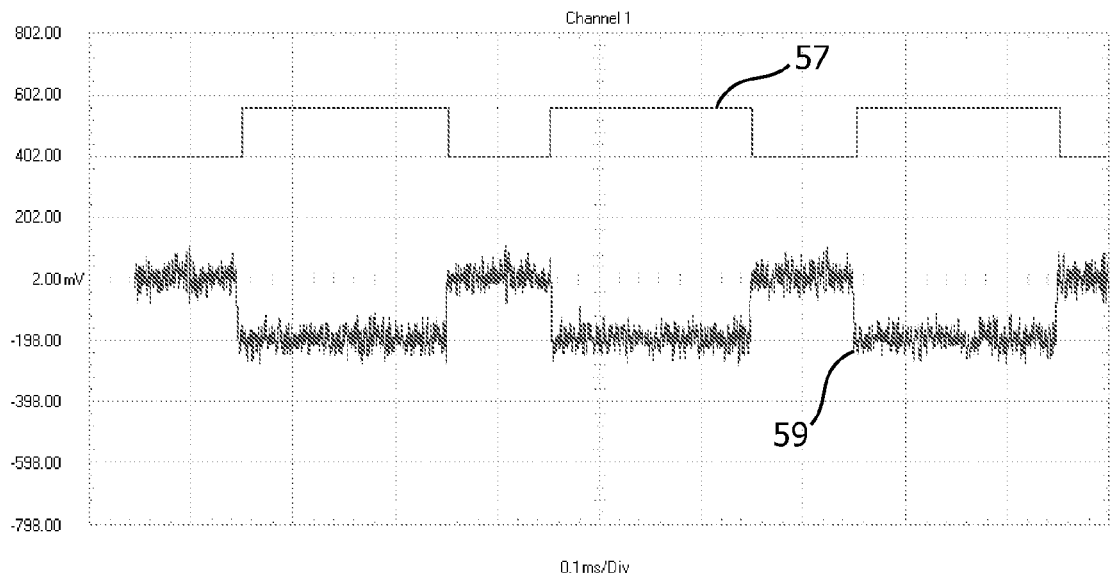
FIG. 5 illustrates the course of a tracking error signal during a scanning of a test track area according to the present invention.

FIG. 5 illustrates a tracking error signal during the scanning of a test track area according to the present invention. The upper trace in FIG. 5 shows a reference signal 57 corresponding to the sequence of written and unwritten portions 51, 53 (or sections 33, 35) of the second test track. In this example a low signal means that an unwritten portion 53 is present and a high signal means that a written portion 51 is present. The lower trace of FIG. 5 shows a signal 59 representing the radial error push pull signal for one spot. Only this radial error push pull signal for one spot is shown for clarity purposes. The respective tracking error signals derived from the main spot 39 and from the first satellite spot 41 will be somewhat similar but shifted in time, resulting in a more complex signal form. The reference signal 57 representing the sequence of written and unwritten portions 51, 53 in the second test track 47 may be derived from one of the optical signals from the recording medium taking into account that there is a duty cycle not equal to 50% (used for distinguishing written from unwritten portions). It could also be generated by the device itself based on the information about at which angles of the revolution written portions 51 are recorded. These angles, or positions, may be predetermined (that is, the same for all recording media of a particular kind), recorded on the recording medium, or determined during writing of the second test track 47 by a device 1 according to the invention.

When the neighboring portion of the second test track 47 is empty, the offset will be nearly zero. Whenever an angle is reached at which a neighboring portion is a written one, an offset in the radial error can be observed. In steady state, the position control means would adjust the offset back to zero. However, because the effects are shorter than the control bandwidth, being for example in the range of 5 kHz, the offset is visible and can easily be measured. The jump between two levels of the radial error push pull signal 59 are used for determining the radial offset.

Figure 6:
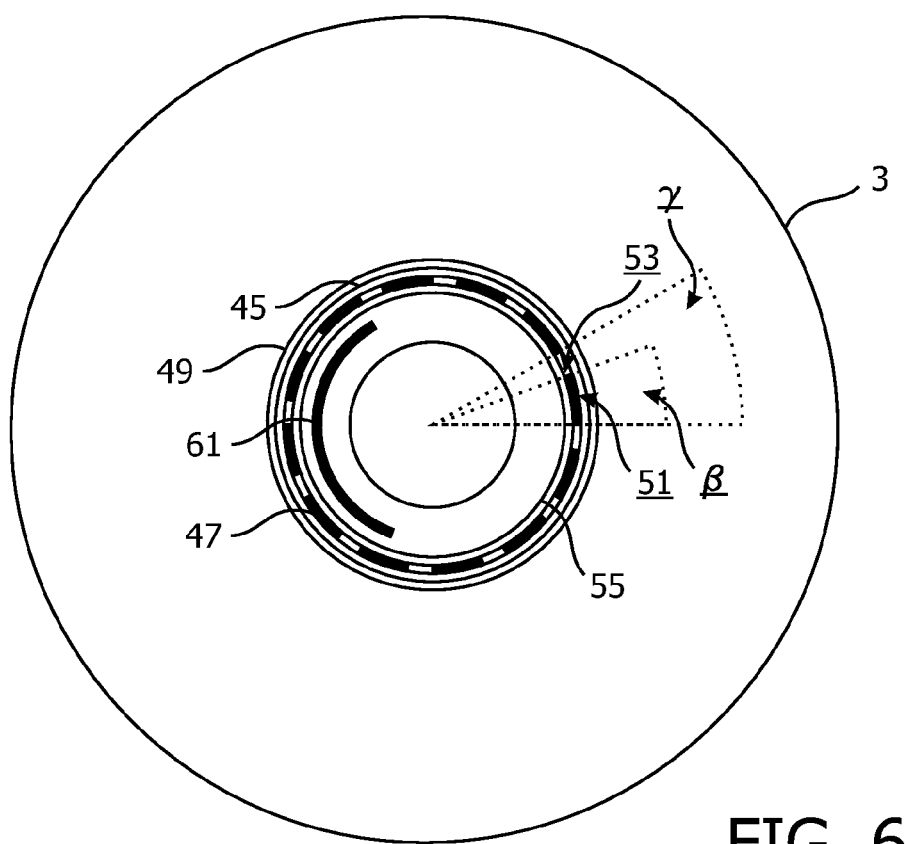
FIG. 6 shows an optical recording medium having a test track area according to the present invention.

FIG. 6 shows an optical recording medium 3 according to the present invention having a test track area 23. Said test track area 23 comprises the first 45, second 47, third 49 and fourth test track 55, wherein said fourth test track is the innermost track of the test track area 23 adjacent to the second test track 47 comprising written and unwritten portions 51, 53. The first track 45 is arranged adjacent to the second test track 47. Said first track 45 is to be scanned for determining the radial offset. The outmost track of the test track area 23 is the third track 49. According to an embodiment of the present invention the recording medium 3 further comprises a data area 61 comprising patterns indicative of values of radial offsets and of device identifiers of devices corresponding to said values of radial offsets.

One of the written portions 51 extends for an angle β. Said written portion 51 extends together with an adjacent unwritten portion 53 for an angle γ. In the illustrated embodiment the sequence of written and unwritten portions is regularly repeating. Now it is only necessary to know the values of the angles β and γ (or similar parameters) to determine the sign of the radial offset by comparing the signal pattern of the tracking error signal (cf. FIG. 5) with the known pattern characterized by the angles β and γ. In this case the value of β is two-thirds of the value of γ, and accordingly the length or angle of the written portion 51 is twice the length or the angle of the unwritten portion 53. Accordingly the duty cycle is 66.6%.

According to an embodiment of the present invention the data area 61 comprises patterns representing the values of the angles β and γ.

It is preferred that at least the length or angular range of at least the shorter one of the successive written 51 and unwritten portion 53 (being in this case the angular range of the unwritten portion 53=γ−β) is so small that the position control means 11 does not react to the corresponding change in the tracking error signal. Typically the normal rotational speed or angular velocity is in the range of 3.5 to 8 Hz in case of a CD and in the range of 10.5 to 25.5 Hz in case of a DVD corresponding to a linear scanning speed of about 1.2 m/s (CD) and about 4.0 m/s (DVD). However, in most cases data is recorded on these recording media with an increased speed. A typical values for a constant linear velocity of the scanning is, for example, 10 m/s, with a bandwidth of the position control means of 5 kHz. For these values respective durations of the written and unwritten portions well below 0.2 ms (=1/(5 kHz)) will be preferred, for example about 0.05 ms. Thus, a preferred length of the written and unwritten portions may be approximately 0.5 mm. An angular velocity of the recording medium during operation of 25 Hz with a bandwidth of 5 kHz gives an upper limit for a preferred angular range of a written or unwritten portion of 1.8°. Therefore, an example of a preferred angular range would be 0.5°.

It has to be noted that the pattern of said written and unwritten portions 51, 53 does not have to be regular or repeating. Even a completely irregular pattern may be used. Furthermore, it is possible to determine the sign of the radial offset from the pattern if the duty cycle is different from 50%. For determining the sign of the radial offset it is only necessary to be able to distinguish between a signal resulting from asymmetric tracking conditions and a signal resulting from symmetric tracking conditions. Furthermore, the sign of the radial offset may always be determined by a trial-and-error method; that is, determining the radial offset without regard to its sign, trying out one of the two possibilities (that is, positive or negative) by writing some data and subsequently checking the result for determining the correct sign.

Figure 7:
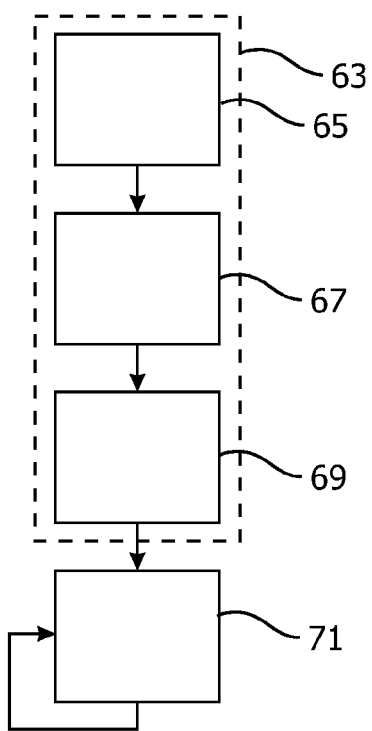
FIG. 7 illustrates a method of scanning an optical recording medium according to the present invention.

FIG. 7 illustrates a method according to the present invention of scanning an optical recording medium. In general this method comprises two steps: A first step 63 of determining a radial offset for an optical unit for reading data from and/or writing data to a recording medium and a second step 71 of tracking the optical recording medium using said radial offset together with a tracking error signal. Once the radial offset is determined in step 63 the tracking step 71 may be repeated many times without the need for a new determination step 63. The first step 63 of determining the radial offset comprises a sub-step 65 of tracking a first test track having asymmetric tracking conditions, a sub-step 67 of generating a tracking error signal, and a sub-step 69 of obtaining the radial offset from said tracking error signal.

The determining step 63 (or a later calibration of the radial offset) may be performed every time a recording medium (for which the radial offset is to be determined) is inserted into the device, or, alternatively, before the actual process of recording is started on that recording medium for the first time. Furthermore, it is possible to store the value of the determined radial offset for later use. In this way the radial offset need not be determined each time a known disc is used.

For a complete compensation of the influence of asymmetric tracking conditions it may be necessary to use a value of the determined radial offset multiplied by a predetermined correction factor. This because it has, for example, to be taken into account that during actual recording all three spots are influenced by the neighboring tracks while the radial offset may be determined for only one spot being influenced. A good value of said predetermined correction factor is in the range of 1.0 to 1.7, preferably in the range of 1.0 to 1.5.

The use of a predetermined correction factor is especially applicable when the measurement is done for all three spots at the same time. In this case the satellite spot close to the written track is fully influenced (that is, gets a full offset), the main spot is influenced to a smaller extent, and the second remote from the written track is hardly influenced. For the three spot push pull signal this implies that the effect of the satellite spots is only taken into account for half. The contribution to the total signal of one satellite spot is normally half the contribution of the main spot. In such case, the radial offset determined by one measurement of all spots may be expected to be too low by about a factor of 2.0/1.5. Thus, a practical value of the predetermined correction factor is now about 1.33 (=2.0/1.5).

It is noted that the predetermined correction factor may be omitted if the radial offset is determined for all spots individually.

The present invention allows for an improved scanning of an optical recording medium by providing a device and a method for scanning an optical recording medium wherein an undesired influence of asymmetric tracking conditions is compensated. This without the need for changes to the hardware of the known optical unit, which would bring about high incremental costs. Furthermore, a corresponding optical recording medium is provided. By evaluating the tracking error signal generated during the scanning of a test track area having predetermined tracking conditions, including symmetric and asymmetric tracking conditions, a radial offset is determined which can be used to compensate the influence of asymmetric tracking conditions when necessary. The corresponding computer program may, for example, be provided in the firmware of the device or, alternatively, as a driver software controlling the device according to the present invention.

In the device claims enumerating several means, these means may be implemented by hardware comprising several distinct elements. However, several of the means may, alternatively, be embodied by one and the same element of hardware. Moreover, a suitably programmed processor may implement one or several of these means.

The invention claimed is:

1. Device (1) for scanning an optical recording medium (3), comprising:
    an optical unit (5) for reading data from and/or writing data to said recording medium (3) by scanning said recording medium (3) with a radiation beam (21), said radiation beam (21) being positioned on said recording medium (3) in response to a tracking error signal,
    a tracking means (7) for generating said tracking error signal,
    a position control means (11) for controlling a radial scanning position of said radiation beam (21) in respect to a track on said recording medium (3),
characterized in that said device (1) further comprises
    a calibration means (9) for determining a radial offset of said tracking error signal, said radial offset being obtained by tracking a first test track (45) of a test track area (23) on said recording medium (3) having asymmetric tracking conditions, and in that
    the position control means (11) is adapted for controlling the radial scanning position of said radiation beam (21) in respect to a track on said recording medium (3) using said tracking error signal and said radial offset, in case of asymmetric tracking conditions.

2. Device (1) for scanning according to claim 1,
    wherein said optical unit (5) is adapted for generating said test track area (23).

3. Device (1) for scanning according to claim 2,
    wherein said optical unit (5) is adapted for generating said test track area (23) by writing a second test track (47) adjacent to said first test track (45), said second test track (47) comprising at least one written portion (51) and at least one unwritten portion (53).

4. Device (1) for scanning according to claim 3,
    wherein a third test track (49) is provided adjacent to said first test track (45) opposite to said second test track (47), wherein said first test track (45) and said third test track (49) are, preferably, at least partially empty tracks.

5. Device (1) for scanning according to claim 3,
    wherein said second test track (47) is surrounded by two at least partially empty tracks (45, 55).

6. Device (1) for scanning according to claim 3,
    wherein at least one of said written and/or said unwritten portions (51, 53) spans an angular range being smaller than a threshold time for reaction of said position control means (11) times the angular velocity of the recording medium (3) during operation.

7. Device (1) for scanning according to claim 3,
    wherein said at least one written portion (51) includes a high frequency data pattern.

8. Device (1) for scanning according to claim 2, wherein said optical unit (5) is adapted for generating said test track area (23) in a power calibration area of said recording medium (3).

9. Device (1) for scanning according to claim 1,
    wherein said tacking means is adapted to generate a three spot push pull tracking error signal and said calibration means (9) is adapted for determining a satellite radial offset for a satellite spot (43, 43') and a main radial offset for a main spot (39) individually and for determining said radial offset from said satellite radial offset and said main radial offset.

10. Device (1) for scanning according to claim 1,
    wherein said position control means (11) is adapted for using said radial offset being multiplied by a predetermined correction factor, said correction factor being in particular in the range of 1.0 to 1.7, preferably in the range of 1.0 to 1.5.

11. Device (1) for scanning according to claim 1.
    further comprising
        a storing means (13) for storing said radial offset, and
        a retrieving means (15) for checking whether or not a radial offset is stored for a recording medium (3) and for retrieving said radial offset.

12. Device (1) for scanning according to claim 11,
    further comprising
        identifying means (17) for generating a medium identifier identifying said recording medium (3), and wherein said
        storing means (13) is adapted for storing said medium identifier together with said radial offset and said
        retrieving means is adapted for checking using said medium identifier generated by said identifying means.

13. Device (1) for scanning according to claim 11, wherein said
    storing moans (13) is adapted for storing said radial offset together with a device identifier identifying said device (1) on said recording medium (1) and said
    retrieving means (15) is adapted for checking for the presence of an device identifier corresponding to said device on said recording medium (3).

14. Device (1) for scanning according to claim 1, wherein said
    calibration means (9) is adapted for determining the sign of said radial offset from a test trucking error signal generated upon scanning said first test track (45), in particular from a duty cycle of said test tracking error signal.

15. Device (1) for scanning according to claim 14, wherein said
    calibration means (9) is adapted for determining said sign by comparing said test tracking error signal to a pattern of written and unwritten portions (51, 53) of said test track area (23).

16. Device (I) for scanning according to claim 15, further comprising
pattern storage means (19) for storing a pattern of written and unwritten portions (51, 53) of said test track area (23) and/or angular positions of written and/or unwritten portions (51, 53) of said test track area (23).

17. Optical recording medium (3) adapted for being scanned by a device (1) according to a device as claimed in claim 1, said optical recording medium (3) comprising
in a predetermined test area (23) a first test track (45) for obtaining said radial offset by tracking said first test track (45),
said first test track (45) being adjacent to a second test track (47),
said second test track (47) comprising at least one written portion (51) and at least one unwritten portion (53).

18. Method for scanning an optical recording medium (3), comprising the steps of:
determining (63) a radial offset for a radiation beam (21) of an optical unit (5) for reading data from and/or writing data to said recording medium (3) by scanning said recording medium (3) with said radiation beam (21) being positioned on said recording medium (3) in response to a tracking error signal, and of
tracking (71) of said optical recording medium (3) using said radial offset, wherein a radial scanning position of said radiation beam (21) in respect to a track on said recording medium (3) is controlled using said tracking error signal and said radial offset, in case of asymmetric tracking conditions,
said determining step (63) including the steps of:
tracking (65) a first test track (45) of a test track area (23) on said recording medium (3) having asymmetric tracking conditions,
generating (67) said tracking error signal by means of a tracking means (7), and
obtaining (69) said radial offset from said tacking error signal.

19. A physical media containing a computer program encoded as variations of the physical properties of the media, and when the physical media interacts with a device (1) for scanning an optical recording medium (3), the physical media controls the device to perform a method as claimed in claim 18 according to the computer of the physical media.

* * * * *